US007826041B2

(12) United States Patent
Takeda

(10) Patent No.: US 7,826,041 B2
(45) Date of Patent: Nov. 2, 2010

(54) REGISTER MARK DETECTION APPARATUS

(75) Inventor: Kazuhiko Takeda, Tokyo (JP)

(73) Assignee: Taiyo Electric Industry Co., Ltd., Nishinippori, Arakawa-ku, Tokyo (JP)

( * ) Notice: Subject to any disclaimer, the term of this patent is extended or adjusted under 35 U.S.C. 154(b) by 0 days.

(21) Appl. No.: 12/663,485

(22) PCT Filed: Feb. 17, 2009

(86) PCT No.: PCT/JP2009/000620

§ 371 (c)(1), (2), (4) Date: Dec. 7, 2009

(87) PCT Pub. No.: WO2009/110173

PCT Pub. Date: Sep. 11, 2009

(65) Prior Publication Data

US 2010/0165343 A1 Jul. 1, 2010

(30) Foreign Application Priority Data

Mar. 5, 2008 (JP) ............................ 2008-055498

(51) Int. Cl.
*G06K 9/74* (2006.01)
*G01J 4/00* (2006.01)

(52) U.S. Cl. .......................... 356/71; 356/364; 356/429

(58) Field of Classification Search .................. 356/71, 356/364, 429–431

See application file for complete search history.

(56) References Cited

U.S. PATENT DOCUMENTS 4,428,670 A * 1/1984 Ruell et al. .................. 356/71

FOREIGN PATENT DOCUMENTS

| | | |
|---|---|---|
| JP | 57-093154 | 6/1982 |
| JP | 64-011835 | 1/1989 |
| JP | 01-283147 | 11/1989 |
| JP | 05-269976 | 10/1993 |
| JP | 09-226097 | 9/1997 |
| JP | 2007-021743 | 2/2007 |
| JP | 2007-030173 | 2/2007 |
| JP | 2007-187459 | 7/2007 |
| JP | 2007-216398 | 8/2007 |

* cited by examiner

*Primary Examiner*—Tarifur Chowdhury
*Assistant Examiner*—Tara S Pajoohi
(74) *Attorney, Agent, or Firm*—Ladas & Parry, LLP

(57) ABSTRACT

A register mark detecting apparatus detects a transparent register mark printed on a conveyed transparent web. The register mark detecting apparatus includes a light source, a parallel light flux irradiation optical system, a collective optical system, a knife-edge, and a light receiving element. The parallel light flux irradiation optical system converts a light flux from the light source into a parallel light flux to irradiate a transparent web with the parallel light flux. The collective optical system collects the light flux transmitted through the transparent web. The knife-edge is disposed near a back focus of the collective optical system. The knife-edge interrupts the light flux going straight in the transparent web and causes only the light flux refracted by being transmitted through the transparent register mark to pass by. The light receiving element receives the light flux transmitted through the knife-edge.

9 Claims, 5 Drawing Sheets

REGISTER MARK DETECTION APPARATUS

CROSS-REFERENCE TO RELATED APPLICATIONS

This application is the U.S. National Stage of International Patent Application No. PCT/JP2009/000620, filed on Feb. 17, 2009, which claims priority to Japanese Application No. 2008-055498 filed on Mar. 5, 2008, the disclosure of which is incorporated herein by reference.

BACKGROUND OF THE INVENTION

1. Field of the Invention

The present invention relates to a register mark detecting apparatus that can detect a transparent register mark printed in invisible ink on conveyed transparent web.

2. Description of the Related Art

When a multicolor pattern is printed on transparent web with a rotary printing machine, usually color patterns are overprinted one by one to form one pattern. At this point, when the color pattern is superimposed, sometimes pattern misalignment is generated or a white space is generated between the colors. Therefore, it is necessary that alignment be correctly performed such that register deviation is not generated. An automatic control apparatus called an automatic registering apparatus is used to perform the correct alignment. Usually, in the automatic registering apparatus, a register mark printed in each color in the transparent web is detected to compute a register deviation amount, and a compensator roller of a printing machine is controlled such that the register deviation is corrected.

As to a method of detecting the register mark printed on the transparent web, there is well known a method of optically detecting the register mark using a register mark detecting apparatus. The register mark detecting apparatus includes a light source such as a halogen lamp and LED and a light receiving element.

The register mark is classified into a register mark printed in visible ink and a register mark printed in invisible ink. In the case of the register mark printed in visible ink, the transparent web is irradiated with visible light to measure a change in quantity of light transmitted through the transparent web, which allows the register mark to be detected. On the other hand, in the case of the register mark printed in invisible ink, the register mark is hardly stably detected because a small difference in light quantity between the light transmitted through the register mark and the light transmitted through a portion in which the register mark is not printed.

For example, in a method disclosed in Patent Document 1, the register mark printed in invisible ink to which a small amount of fluorescent bleaching agent is added is irradiated with ultraviolet light to generate luminescence, thereby detecting the register mark. In a method disclosed in Patent Document 2, the register mark printed in invisible ink to which an ultraviolet absorber is added is irradiated with the ultraviolet light, and the register mark is detected from a change in quantity of light reflected or transmitted by ultraviolet absorption.

[Patent Document 1] Japanese Patent Application (Laid Open) No. S57-93154

[Patent Document 2] Japanese Patent Application (Laid Open) No. H1-283147

However, in case where additives such as a fluorescent bleaching agent and an ultraviolet absorber are added to the invisible ink like Patent Documents 1 and 2, possibly an appearance of a printed paper is adversely affected. Because the use of the light source emitting the ultraviolet light is required, cost of the apparatus is increased compared with the use of the visible light source.

SUMMARY OF THE INVENTION

In view of the foregoing, a general purpose of the invention is to provide a register mark detecting apparatus that can suitably detect the register mark printed in invisible ink on the transparent web.

In accordance with an aspect of the invention, a register mark detecting apparatus that can detect a transparent register mark printed in invisible ink on conveyed transparent web, the register mark detecting apparatus includes a light source; irradiation device for converting a light flux from the light source into a parallel light flux to irradiate the transparent web with the parallel light flux; collective device for collecting a light flux transmitted through the transparent web; a knife-edge that is disposed near a back focus of the collective device, the knife-edge interrupting a light flux going straight in the transparent web while causing a light flux refracted by being transmitted through the transparent register mark to pass by; and light receiving device for receiving light flux passing by the knife-edge.

Accordingly, when the transparent register mark is irradiated with the parallel light flux by the irradiation device, the light flux is incident to the light receiving device, so that the transparent register mark can be detected. Because the refraction caused by optical unevenness of the transparent register mark is utilized in the register mark detecting apparatus, the transparent register mark can be detected without adding additives such as a fluorescent bleaching agent and an ultraviolet absorber to the invisible ink. Accordingly, the appearance of the printed material is not adversely affected. Further, because the visible light source is used, the cost of the apparatus can be reduced.

The register mark detecting apparatus in accordance with the aspect of the invention may further include knife-edge moving device for moving the knife-edge. In the register mark detecting apparatus in accordance with the aspect of the invention, the knife-edge moving device may move the knife-edge to a position retracted from a back focus of the collective device so as not to interrupt the light flux going straight in the transparent web, when a visible register mark printed in visible ink is detected.

In such cases, the visible register mark printed in visible ink can be detected by retracting the knife-edge from the back focus of the collective device. The register mark detecting apparatus acts as both the visible register mark detecting apparatus and the transparent register mark detecting apparatus, so that the apparatus can be simplified to reduce the cost.

The register mark detecting apparatus in accordance with the aspect of the invention may further include knife-edge position storage device for storing a suitable position of the knife-edge to detect the transparent register mark in each kind of the invisible ink used in the transparent register mark; and control device for selecting the knife-edge position according to the kind of the invisible ink from the knife-edge position storage device and controlling the knife-edge moving device so as to obtain the selected knife-edge position. The suitable knife-edge position to detect the transparent register mark depends on the kind of the invisible ink. However, when the register mark detecting apparatus includes the knife-edge position storage device and the control device, the transparent register mark can be detected even if the kind of the invisible ink is changed.

The register mark detecting apparatus in accordance with the aspect of the invention may further include a plurality of interference filters having different passbands, the plurality of interference filters being in front of the light receiving device; and interference filter switching device for switching the plurality of interference filters according to the kind of the invisible ink used in the transparent register mark. When the interference filter is disposed in front of the light receiving device, although the light having the excess wavelength can be cut to suitably detect the transparent register mark. However, the passband of the optimal interference filter depends on the kind of the invisible ink used in the transparent register mark. Therefore, the register mark detecting apparatus includes the plurality of interference filters having different passbands and the interference filter switching device, so that the interference filter suitable to the kind of the invisible ink can be used.

The register mark detecting apparatus in accordance with the aspect of the invention may further include a polarizer that is disposed between the irradiation device and the transparent web; and an analyzer that is disposed between the transparent web and the light receiving device while a crossed nicol state is established between the polarizer and the analyzer. In such cases, the excess light flux is cut, so that the transparent register mark can suitably be detected.

The register mark detecting apparatus in accordance with the aspect of the invention may further include signal processing device for producing one pulse based on a first pulse and a second pulse, the one pulse rising or falling at a first time while falling or rising at a second time, the first pulse being generated at the first time one of ends of the transparent register mark enters the parallel light flux emitted from the irradiation device, the second pulse being generated at the second time the other end of the transparent register mark goes out the parallel light flux emitted from the irradiation device.

When the transparent register mark is detected with the register mark detecting apparatus, two steep pulses are supplied at the first time one of the ends of the transparent register mark enters the parallel light flux and the second time the other end goes out the parallel light flux. When the signal is directly used, because a signal waveform becomes different from the signal obtained in detecting the visible register mark, a register status is hardly confirmed in the initial registering. Therefore, even in cases where transparent register mark is detected while the register mark detecting apparatus includes the signal processing device that produces the one pulse, the registering of the transparent register mark can be dealt with in the manner similar to that of the visible register mark, and the register status can be confirmed in the initial registering.

In the register mark detecting apparatus in accordance with the aspect of the invention, the light source may be a light source that emits strobe light, and the light receiving device may be an image sensing device that takes an image of the light flux having passed by the knife-edge. The register mark detecting apparatus in accordance with the aspect of the invention may further include display device for displaying an image taken by the image sensing device. In such cases, because the printing state of the transparent register mark is visualized as a still image, the printing state of the transparent register mark can be monitored based on the visible image.

Any combination of the constituents and expressions of the invention, replaced among the method, apparatus, system, recording medium, and computer program are also included in the aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Exemplary embodiment of the invention will be described in detail with reference to the drawings.

Figure 1:
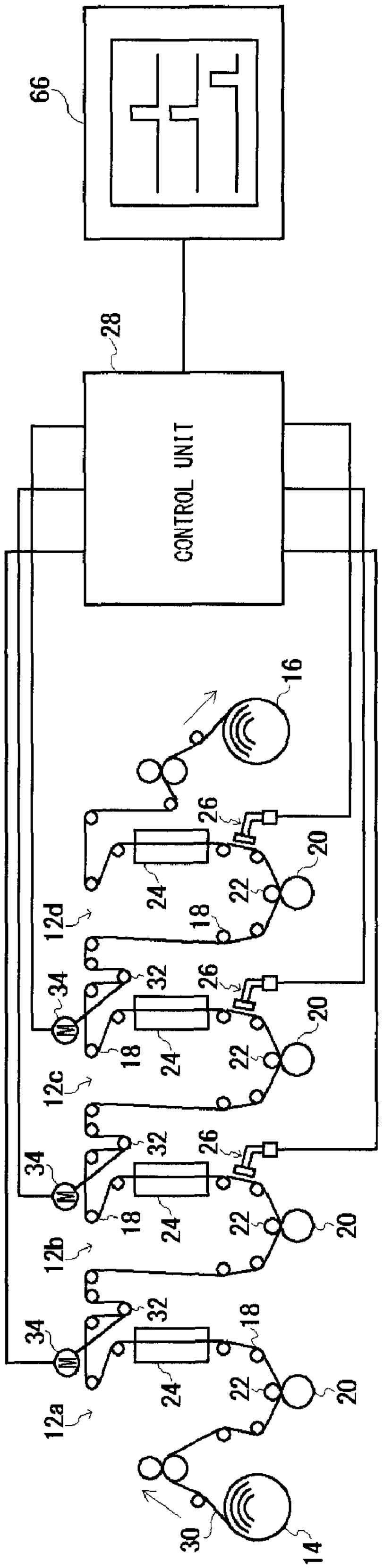
FIG. 1 is a view illustrating a rotary printing machine in which a register mark detecting apparatus according to an embodiment of the invention is used.

FIG. 1 is a view illustrating a rotary printing machine 100 in which a register mark detecting apparatus according to an embodiment of the invention is used. The rotary printing machine 100 of FIG. 1 is a photogravure rotary printing machine that can perform a four-color process to transparent web 30 such as film.

Referring to FIG. 1, a first printing unit 12*a*, a second printing unit 12*b*, a third printing unit 12*c*, and a fourth printing unit 12*d* are arranged in series in the rotary printing machine 100. Sometimes the first printing unit 12*a*, the second printing unit 12*b*, the third printing unit 12*c*, and the fourth printing unit 12*d* are collectively referred to as "printing unit 12".

An unwinding unit 14 is placed on an upstream of the first printing unit 12*a* in order to supply the transparent web 30 to be printed. A winding unit 16 is placed on a downstream of the fourth printing unit 12*d* in order to wind the printed transparent web 30. A plurality of guide rollers 18 is provided in each printing unit 12 to form a conveying path of the transparent web 30.

In each of the printing units 12, a printing cylinder 20 and an impression cylinder 22 are rotatably attached to each other along cylindrical shafts thereof. while sandwiching the transparent web 30 therebetween. The printing cylinder 20 is provided below the transparent web 30 to transfer ink that is of a coating agent, and the impression cylinder 22 is provided above the transparent web 30 to apply a pressure to the transparent web 30. A drying machine 24 is disposed on the downstream of each printing cylinder 20 in order to dry a printing surface of the transparent web 30.

In the second printing unit 12*b*, the third printing unit 12*c*, and the fourth printing unit 12*d*, a scanning head 26 is disposed between the printing cylinder 20 and the drying machine 24. In each scanning head 26, two register mark detecting apparatuses are provided side by side at predetermined standard distance Dst in a conveying direction of the transparent web 30.

For example, in the scanning head 26 of the second printing unit 12*b*, one of the register mark detecting apparatuses detects a register mark (referred to as first register mark) printed by the upstream first printing unit 12*a*, and the other register mark detecting apparatus detects a register mark (referred to as second register mark) printed by the printing cylinder 20 of the second printing unit 12*b*. The scanning head 26 is electrically connected to a control unit 28, and the control unit 28 operates an amount of register deviation between the first register mark and the second register mark. A longitudinal register deviation that is of the register deviation in the conveying direction of the transparent web 30 can be detected in the embodiment.

Compensator rollers 32 are disposed between the first printing unit 12*a* and the second printing unit 12*b*, between the second printing unit 12*b* and the third printing unit 12*c*, and between the third printing unit 12*c* and the fourth printing unit 12*d* in order to adjust a supply phase of the transparent web 30. A register motor 34 drives the compensator roller 32. Each register motor 34 is electrically connected to the control unit 28, and the motor 34 vertically moves the compensator roller 32 so as to eliminate the longitudinal register deviation in response to an instruction provided from the control unit 28. Therefore, a longitudinal print deviation can be corrected.

In the rotary printing machine 100, a monitor 66 is also connected to the control unit 28. A signal detected by the scanning head 26 is displayed on the monitor 66. A user can monitor the monitor 66 to visually recognize the status of the register deviation.

Figure 2:
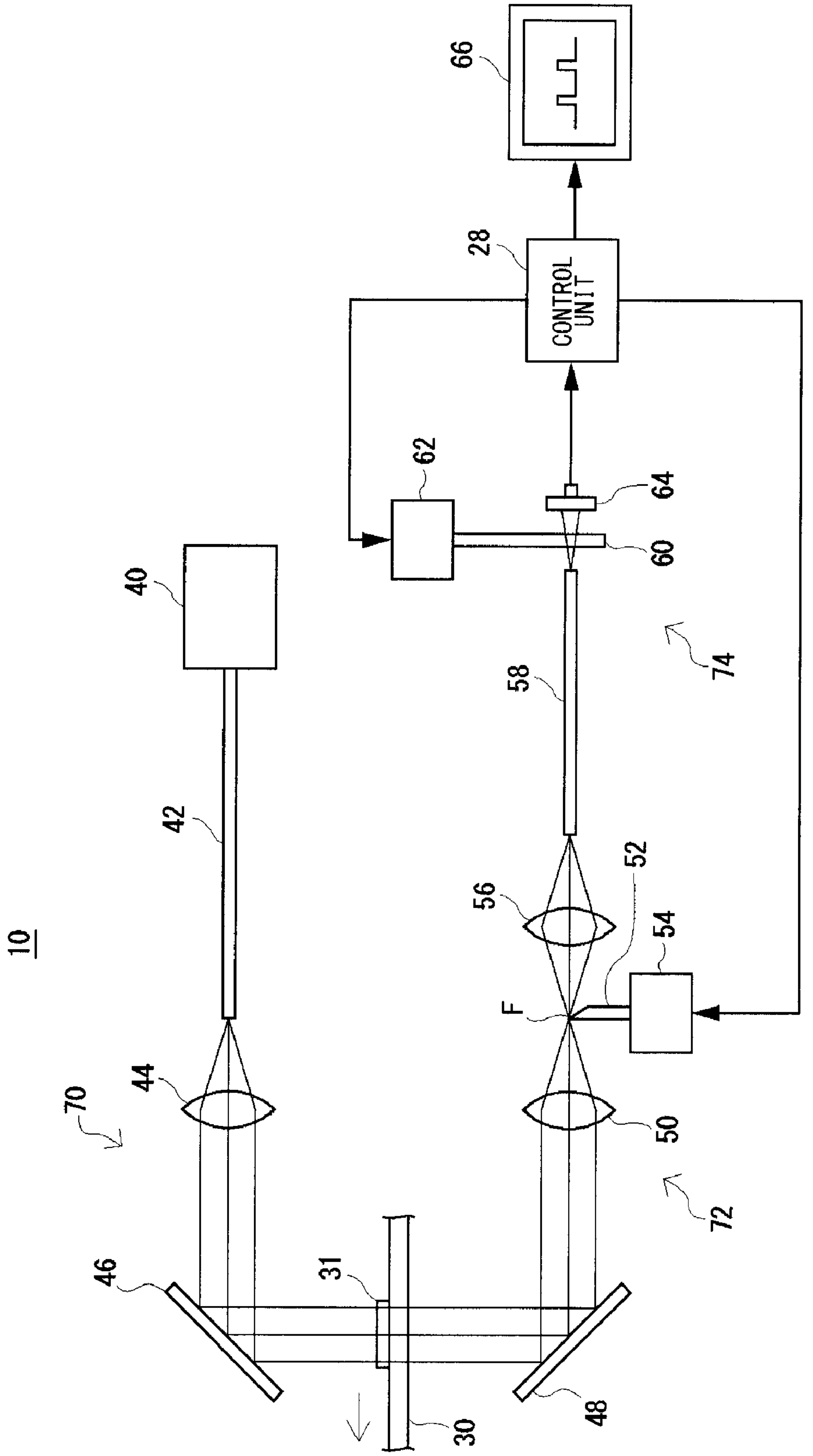
FIG. 2 is a view for explaining the register mark detecting apparatus according to the embodiment of the invention.

FIG. 2 is a view for explaining the register mark detecting apparatus 10 according to the embodiment. The register mark detecting apparatus 10 can detect both a transparent register mark printed in invisible ink and a visible register mark printed in visible ink.

Referring to FIG. 2, the register mark detecting apparatus 10 includes a light source 40, a parallel light flux irradiation optical system 70, a collective optical system 72, a knife-edge 52, and a light receiving optical system 74.

The light source 40 emits visible light. The light source 40 has a function of emitting a point light source. For example, a halogen lamp, LED, and a xenon lamp can be used as the light source 40. The light emitted from the light source 40 is incident to the parallel light flux irradiation optical system 70 through an optical fiber 42. For example, the optical fiber 42 is made of quartz, multicomponent glass, or acrylic resin. In selecting the material for the optical fiber 42, desirably optical unevenness is hardly generated when a light flux is transmitted through the optical fiber.

The parallel light flux irradiation optical system 70 includes a collimator lens 44 and a first mirror 46. The collimator lens 44 converts the light flux from the light source 40 into a parallel light flux. The parallel light flux is reflected by the first mirror 46, and the conveyed transparent web 30 is perpendicularly irradiated with the parallel light flux. The light flux transmitted through the transparent web 30 is incident to the collective optical system 72. FIG. 2 illustrates the state in which the parallel light flux is transmitted through a transparent register mark 31 printed on the transparent web 30.

The collective optical system 72 includes a second mirror 48 and a collective lens 50. The light flux transmitted through the transparent web 30 is reflected by the second mirror 48 and collected by the collective lens 50. The light flux collected by the collective lens 50 is converged on aback focus F of the collective lens 50.

In the embodiment, the optical system includes the first mirror 46 and the second mirror 48, so that the register mark detecting apparatus can be miniaturized. Alternatively, there may be formed an optical system, in which the transparent web 30 is directly and perpendicularly irradiated with the parallel light flux from the collimator lens 44 and the light flux transmitted through the transparent web 30 is directly collected by the collective lens 50. In such cases, the number of components is decreased, so that the register mark detecting apparatus can be formed at low cost.

The knife-edge 52 is disposed near the back focus F of the collective lens 50. A knife-edge moving mechanism 54 is provided in the knife-edge 52 in order to move a position of the knife-edge 52. The knife-edge moving mechanism 54 is electrically connected to the control unit 28, and the knife-edge moving mechanism 54 can adjust the position of the knife-edge 52 in response to the instruction provided from the control unit 28.

A color of ink that is used in the printing performed by each printing unit 12 of the rotary printing machine 100 is stored in the control unit 28, and the control unit 28 previously recognizes whether each register mark detecting apparatus 10 should detect the transparent register mark 31 or the register visible register mark. The control unit 28 can switch an operation mode of the register mark detecting apparatus 10 between a transparent register mark detecting mode for detecting the transparent register mark 31 and a visible register mark detecting mode for detecting the visible register mark.

In the case of the transparent register mark detecting mode, the position of the knife-edge 52 is adjusted such that the light flux going straight in the transparent web 30 is interrupted by the knife-edge 52 and such that only the light flux refracted by the optical unevenness of the transparent register mark 31 passes by the knife-edge 52. That is, the light flux transmitted through a portion in which the transparent register mark 31 of the transparent web 30 is not printed is interrupted by the knife-edge 52, while the light flux refracted by being transmitted through the transparent register mark 31 passes by the knife-edge 52. Accordingly, the transparent register mark 31 can be detected by measuring a light quantity of the light flux having passed by the knife-edge 52.

In the case of the visible register mark detecting mode, the knife-edge 52 is adjusted in the position separated from the back focus F so as to interrupt the light flux going straight in the transparent web 30. That is, the light flux transmitted through a portion in which the visible register mark of the transparent web 30 is not printed passes by the knife-edge 52. On the other hand, because the light flux with which the visible register mark is irradiated is interrupted or attenuated by the visible register mark, the light quantity of the light flux having passed by the knife-edge 52 is decreased. Accordingly, the visible register mark can be detected by measuring the light quantity of the light flux passing by the knife-edge 52.

The control unit 28 includes a knife-edge position storage unit in which the suitable position of the knife-edge 52 to detect the transparent register mark 31 is stored each kind of the invisible ink used in the transparent register mark 31. The control unit 28 includes a knife-edge position control unit. The knife-edge position control unit selects the knife-edge position from the knife-edge position storage unit according to the kind of the invisible ink, and the knife-edge position control unit controls the knife-edge moving mechanism 54 so as to obtain the selected knife-edge position. The knife-edge moving mechanism 54 includes a rotary encoder (not illustrated) that detects the position of the knife-edge 52 and a motor (not illustrated) that moves the knife-edge 52. The control unit 28 controls the knife-edge position based on pieces of information on the rotary encoder and motor. Alternatively, a servo motor in which the encoder function and the motor function are incorporated may be used. The suitable position of the knife-edge 52 to detect the transparent register mark 31 depends on the kind of the invisible ink used in the transparent register mark 31. However, when the control unit 28 includes the knife-edge position storage unit and the knife-edge position control unit, the transparent register mark 31 can suitably be detected even if the kind of the invisible ink is changed.

The light flux having passed by the knife-edge 52 is incident to the light receiving optical system 74. The light receiving optical system 74 includes a lens 56, an optical fiber 58, an interference filter unit 60, and a light receiving element 64. The light flux passing by the knife-edge 52 is collected by the lens 56 and incident to one of ends of the optical fiber 58. The light flux outgoing from the other end of the optical fiber 58 is received by the light receiving element 64 through the interference filter unit 60, and photoelectric conversion is performed to the light flux. For example, a photodiode, a photomultiplier, and a phototube may be used as the light receiving element 64.

A plurality of interference filters having different passbands are arranged in the interference filter unit 60. In the embodiment, three interference filters having R, G, and B passbands are arranged in line. An interference filter switching mechanism 62 is provided in the interference filter unit 60, and the interference filter switching mechanism 62 can move the interference filter unit 60 to switch the interference filters transmitting the light fluxes in response to the instruction from the control unit 28. Thus, the interference filters can be switched. For example, in the transparent register mark detecting mode, the optimal interference filter can be selected according to the kind of the invisible ink used in the transparent register mark 31 while the light quantity or spectrum of the detected light flux is observed. In the visible register mark detecting mode, the optimal interference filter can be selected while the light quantity or spectrum of the detected light flux is observed.

The electric signal to which the light receiving element 64 performs the photoelectric conversion is sent to the control unit 28, and signal processing, described later, is performed to the electric signal. The electric signal to which the control unit 28 performs the signal processing is displayed on the monitor 66.

As described above, in the transparent register mark detecting mode, the register mark detecting apparatus 10 of the embodiment can detect the transparent register mark 31, because the light flux is incident to the light receiving element 64 only when the parallel light flux irradiation optical system 70 irradiates the transparent register mark 31 with the parallel light flux.

Because the refraction caused by the optical unevenness of the transparent register mark 31 is utilized in the register mark detecting apparatus 10 of the embodiment, the register mark detecting apparatus 10 can detect the transparent register mark 31 even if additives such as a fluorescent bleaching agent and an ultraviolet absorber are not added to the invisible ink. Accordingly, the invisible ink cost can be reduced without adversely affecting the appearance of the printed paper. Because the visible light source 40 is used, the use of the ultraviolet light source is not required, and the register mark detecting apparatus can be produced at low cost.

In the register mark detecting apparatus 10 of the embodiment, because the transparent web 30 is irradiated with the parallel light flux, the register mark can stably be detected even if the transparent web 30 is vibrated in conveying the transparent web 30 at high speed.

Figure 3A:
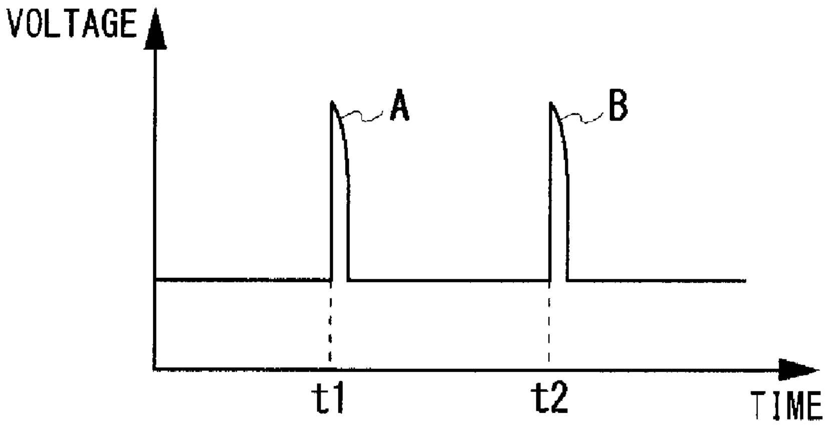
FIGS. 3A and 3B are views for explaining signal processing in a control unit.
Figure 3B:
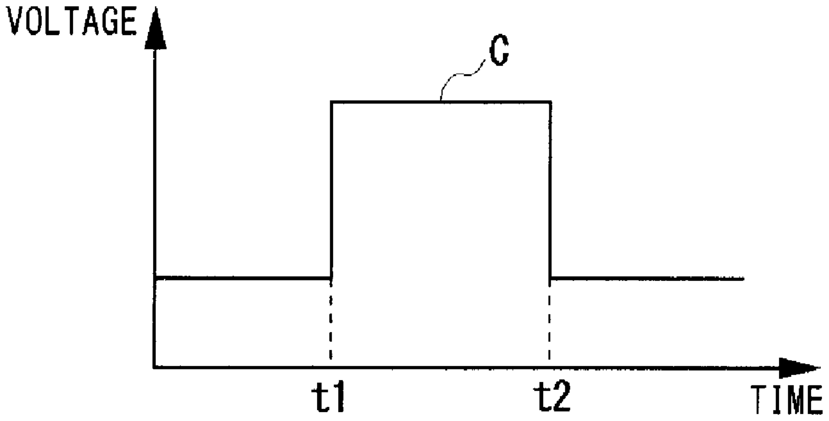

FIGS. 3A and 3B are views for explaining the signal processing in the control unit 28. FIG. 3A illustrates the state in which the electric signal before the signal processing is performed and immediately after the light receiving element 64 performs the photoelectric conversion.

When the transparent register mark 31 printed in the conveyed transparent web 30 is detected with the register mark detecting apparatus 10 of the embodiment, as illustrated in FIG. 3A, the light receiving element 64 supplies two steep pulses A and B at a time t1 one of ends of the transparent register mark 31 enters the parallel light flux and at a time t2 the other end goes out the parallel light flux. On the other hand, when the visible register mark printed in the transparent web 30 is detected, the light receiving element 64 supplies one pulse. In the pulse, a voltage falls at a time one of ends of the visible register mark enters the parallel light flux, and the voltage rises at a time the other end goes out the parallel light flux.

When the signal supplied from the light receiving element 64 is directly supplied to the monitor 66, or when the signal is supplied to the monitor 66 while simply amplified, because a signal waveform becomes different from the signal obtained in detecting the visible register mark, a register status is hardly confirmed in the initial registering of the registering apparatus.

Therefore, in the embodiment, the control unit 28 converts the two steep pulses A and B supplied from the light receiving element 64 into one pulse C. As illustrated in FIG. 3B, in the pulse C, a voltage rises at the time t1, and the voltage falls at the time t2. Even in cases where the transparent register mark is detected, a signal waveform similar to that of the visible register mark is displayed on the monitor 66. Therefore, the registering of the transparent register mark can be dealt with in the manner similar to that of the visible register mark, and the register status can be confirmed in the initial registering. The detection of the transparent register mark differs from the detection of the visible register mark in that the rise and fall of the voltage are inverted. The polarity of the voltage can appropriately be inverted using an inverter circuit or an inverting amplifier circuit.

Figure 4:
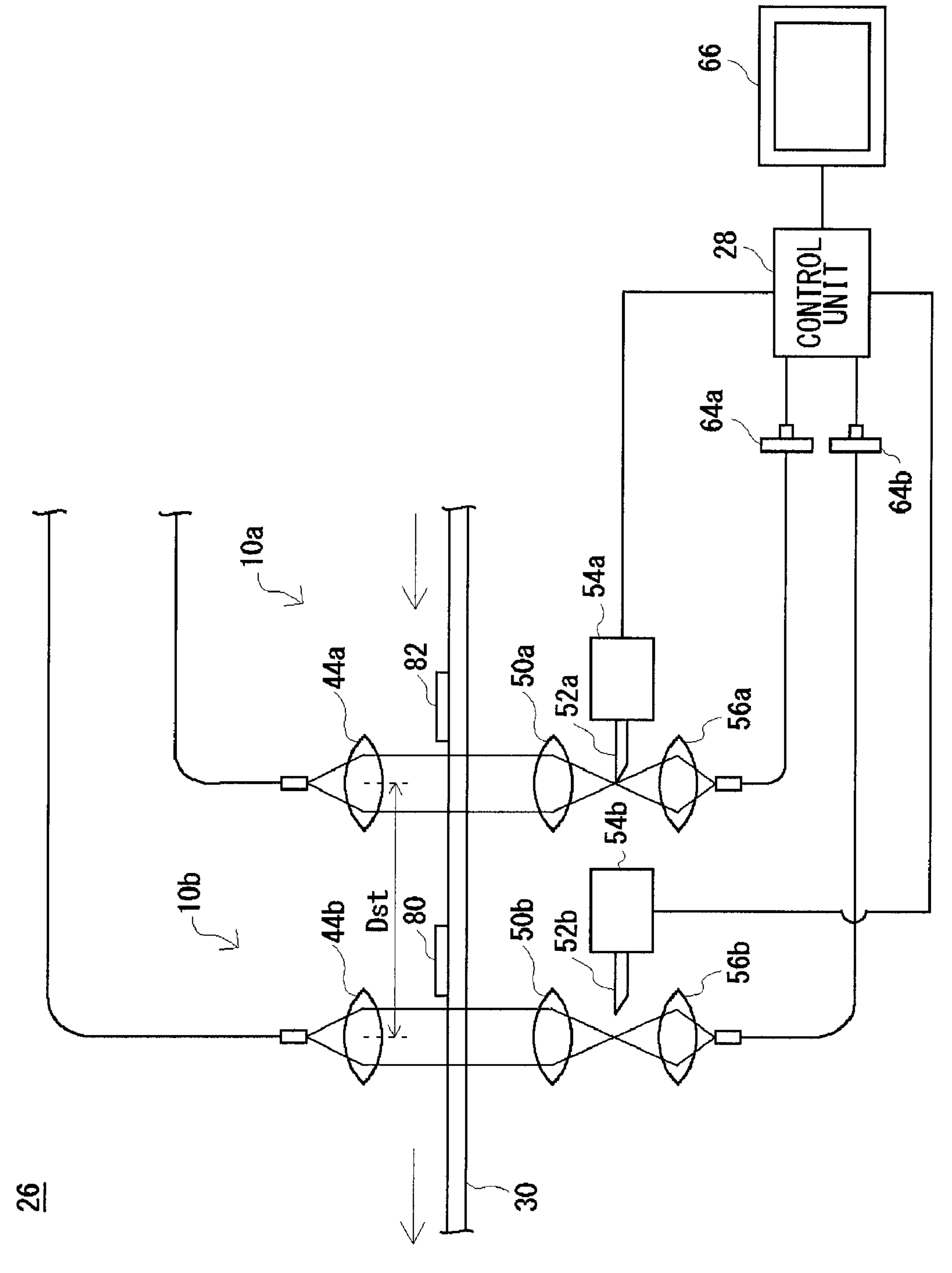
FIG. 4 is a view for explaining a configuration of a scanning head.

FIG. 4 is a view for explaining a configuration of the scanning head 26. The scanning head 26 disposed in the second printing unit 12*b* of the rotary printing machine 100 of FIG. 1 will be described by way of example. In the rotary printing machine 100, it is assumed that the first printing unit 12*a* prints a visible register mark 80 and the second printing unit 12*b* prints a transparent register mark 82.

As illustrated in FIG. 4, the scanning head 26 includes a first register mark detecting apparatus 10*a* and a second register mark detecting apparatus 10*b*. In the first and second register mark detecting apparatuses 10*a* and 10*b*, the transparent web 30 is directly and perpendicularly irradiated with the parallel light fluxes from collimator lenses 44*a* and 44*b*, and the light fluxes transmitted through the transparent web 30 is directly collected by collective lenses 50*a* and 50*b*. The light fluxes collected by the collective lenses 50*a* and 50*b* are collected by lenses 56*a* and 56*b* through knife-edges 52*a* and 52*b*, and light receiving elements 64*a* and 64*b* perform the photoelectric conversion to the light fluxes. In FIG. 4, the light source and the interference filter unit are not described in the first and second register mark detecting apparatuses 10*a* and 10*b*.

In the scanning head 26, the collimator lens 44*a* and collective lens 50*a* in the first register mark detecting apparatus 10*a* and the collimator lens 44*b* and collective lens 50*b* in the second register mark detecting apparatus 10_b_ are provided in parallel at predetermined standard distance Dst. For example, the standard distance Dst is set to 20 mm. Hereinafter the state in which the collimator lens 44_a_ and collective lens 50_a_ in the first register mark detecting apparatus 10_a_ and the collimator lens 44_b_ and collective lens 50_b_ in the second register mark detecting apparatus 10_b_ are provided in parallel at the predetermined standard distance Dst simply describes that the first register mark detecting apparatus 10_a_ and the second register mark detecting apparatus 10_b_ are provided in parallel at the predetermined standard distance Dst.

In the scanning head 26, the first register mark detecting apparatus 10_a_ located upstream is set to the transparent register mark detecting mode, and the second register mark detecting apparatus 10_b_ located downstream is set to the visible register mark detecting mode. The control unit 28 provides an instruction to the knife-edge moving mechanism 54_a_ of the first register mark detecting apparatus 10_a_, the knife-edge 52_a_ of the first register mark detecting apparatus 10_a_ interrupts the light flux going straight in the transparent web 30, and only the light flux refracted by the optical unevenness of the transparent register mark 82 passes by the knife-edge 52_a_. The control unit 28 provides an instruction to the knife-edge moving mechanism 54_b_ of the second register mark detecting apparatus 10_b_, and the knife-edge 52_b_ is moved to the position separated from the back focus F so as not to interrupt the light flux going straight in the transparent web 30.

Figure 5A:
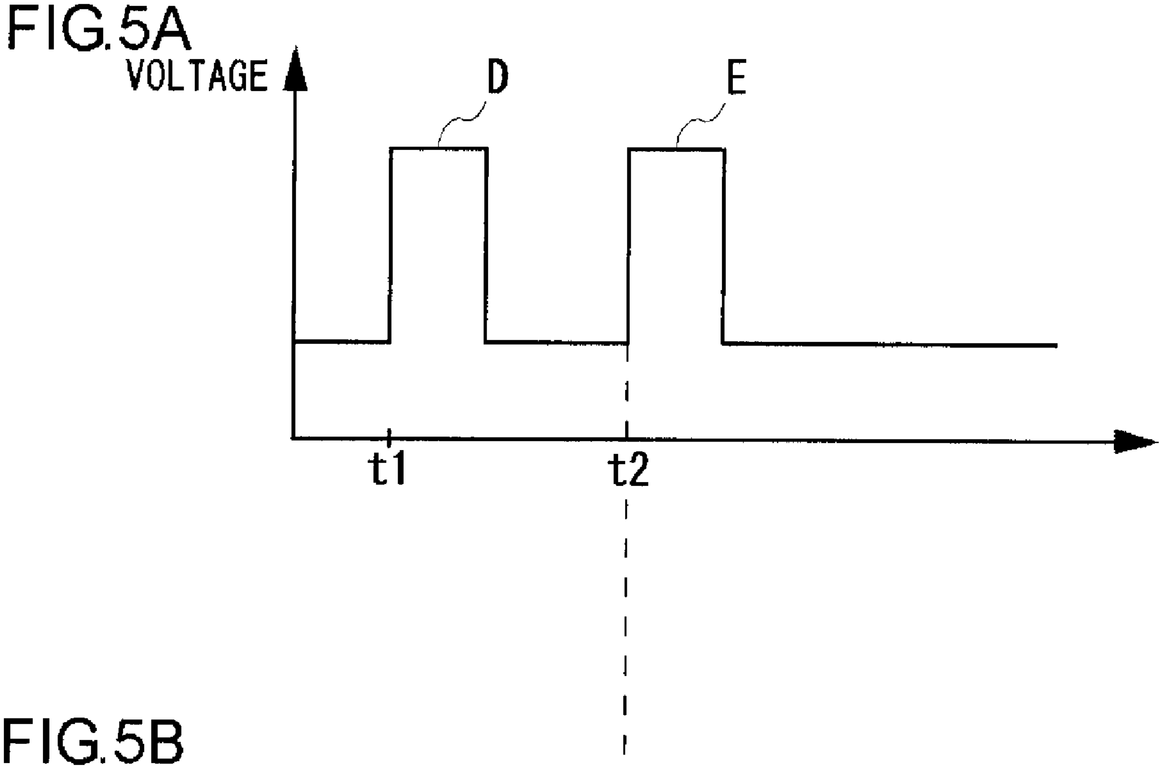
FIGS. 5A and 5B are views illustrating detection signals of the scanning head.
Figure 5B:
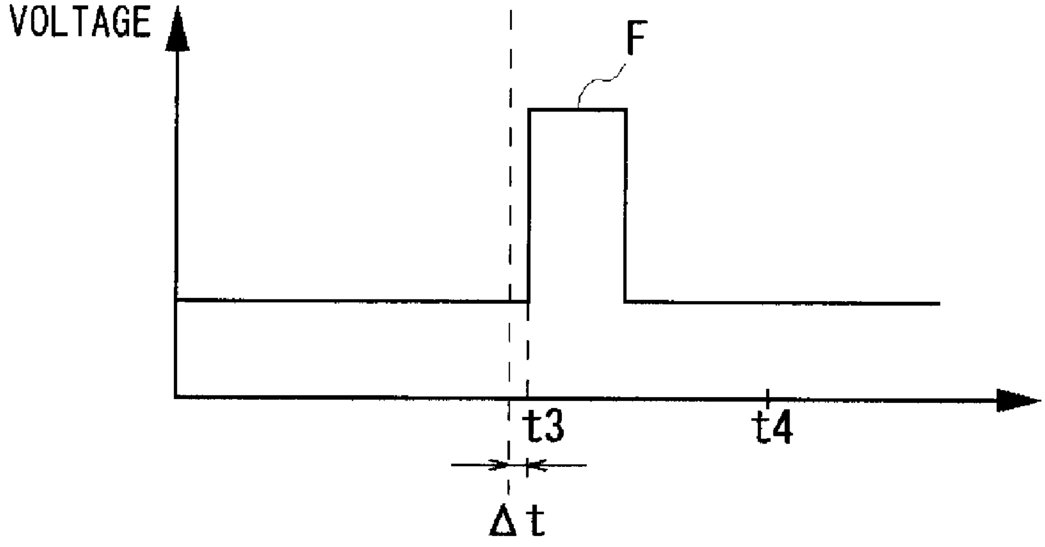

FIGS. 5A and 5B are views illustrating detection signals of the scanning head 26. FIG. 5A is a view illustrating the detection signal of the first register mark detecting apparatus 10_a_, and FIG. 5B is a view illustrating the detection signal of the second register mark detecting apparatus 10_b_. FIG. 5B illustrates the signal detected by the light receiving element 64_b_ of the second register mark detecting apparatus 10_b_ while the signal is inverted.

In the scanning head 26 of FIG. 4, the first register mark detecting apparatus 10_a_ supplies a pulse D at a time t1 the visible register mark 80 enters the parallel light flux irradiated by the first register mark detecting apparatus 10_a_, and the first register mark detecting apparatus 10_a_ supplies a pulse E at a time t2 the transparent register mark 82 enters the parallel light flux irradiated by the first register mark detecting apparatus 10_a_.

Because the second register mark detecting apparatus 10_b_ is in the visible register mark detecting mode, the second register mark detecting apparatus 10_b_ supplies a pulse F at a time t3 the visible register mark 80 enters the parallel light flux irradiated by the second register mark detecting apparatus 10_b_, and the second register mark detecting apparatus 10_b_ does not supply the pulse at a time t4 the transparent register mark 82 enters the parallel light flux irradiated by the second register mark detecting apparatus 10_b_.

At this point, because the distance between the first register mark detecting apparatus 10_a_ and the second register mark detecting apparatus 10_b_ is set to the standard distance Dst, the rise time t2 of the pulse E is matched with the rise time t3 of the pulse F in FIGS. 5A and 5B when a register mark distance Dm between the visible register mark 80 and the transparent register mark 82 is equal to the standard distance Dst.

On the other hand, when the register mark distance Dm is not equal to the standard distance Dst, the rise time t2 of the pulse E is different from the rise time t3 of the pulse F. The control unit 28 operates the amount of register deviation between the visible register mark 80 and the transparent register mark 82 from a difference Δt between the times t2 and t3. The control unit 28 controls the position actuation of the compensator roller 32 such that the register deviation amount is eliminated, so that the registering can be performed between patterns of a proof printed in visible ink by the first printing unit 12_a_ and patterns of a proof in invisible ink by the second printing unit 12_b_.

The embodiment of the invention is described above only by way of example. Obviously, it is noted for those skilled in the art that various modifications can be made in combination of constituents or processing processes without departing from the scope of the invention.

For example, in the register mark detecting apparatus 10 of FIG. 2, a polarizer is disposed between the first mirror 46 and the transparent web 30, and an analyzer may be disposed between the transparent web 30 and the second mirror 48 while a crossed nicol state is established between the polarizer and the analyzer. In such cases, because the excess light flux is cut, the transparent register mark can suitably be detected.

In the register mark detecting apparatus 10 of FIG. 2, a light source that emits strobe light is used as the light source 40, an image sensing device such as CCD and CMOS that takes an image of the light flux having passed by the knife-edge 52 is used as the light receiving element 64, and the image taken by the image sensing device may be displayed on the display device. In such cases, a still image apparatus in which the printing state of the transparent register mark 31 is visualized as a still image can be realized.

In the register mark detecting apparatus 10 of FIG. 2, the register mark is irradiated with the parallel light flux using the leans, and the parallel light flux is converged. Alternatively, a similar optical system may be formed using a concave mirror. In such cases, because the region irradiated with the parallel light flux is increased, the register mark detecting apparatus can be applied to a rotary printing machine that prints a larger transparent web.

The invention claimed is:

1. A register mark detecting apparatus that can detect a transparent register mark printed in invisible ink on conveyed transparent web, the register mark detecting apparatus comprising:

a light source;

irradiation device for converting a light flux from the light source into a parallel light flux to irradiate the transparent web with the parallel light flux;

collective device for collecting a light flux transmitted through the transparent web;

a knife-edge that is disposed near a back focus of the collective device, the knife-edge interrupting a light flux going straight in the transparent web while causing a light flux refracted by being transmitted through the transparent register mark to pass by; and light receiving device for receiving light flux having passed by the knife-edge.

2. The register mark detecting apparatus according to claim 1, further comprising knife-edge moving device for moving the knife-edge.

3. The register mark detecting apparatus according to claim 2, wherein the knife-edge moving device moves the knife-edge to a position retracted from a back focus of the collective device so as not to interrupt the light flux going straight in the transparent web, when a visible register mark printed in visible ink is detected.

4. The register mark detecting apparatus according to claim 2, further comprising:

knife-edge position storage device for storing a suitable position of the knife-edge to detect the transparent register mark in each kind of the invisible ink used in the transparent register mark; and control device for selecting the knife-edge position according to the kind of the invisible ink from the knife-edge position storage device and controlling the knife-edge moving device so as to obtain the selected knife-edge position.

5. The register mark detecting apparatus according to claim 1, further comprising:

a plurality of interference filters having different pass-bands, the interference filters being in front of the light receiving device; and interference filter switching device for switching the plurality of interference filters according to the kind of the invisible ink used in the transparent register mark.

6. The register mark detecting apparatus according to claim 1, further comprising:

a polarizer that is disposed between the irradiation device and the transparent web; and an analyzer that is disposed between the transparent web and the light receiving device while a crossed nicol state is established between the polarizer and the analyzer.

7. The register mark detecting apparatus according to claim 1, further comprising signal processing device for producing one pulse based on a first pulse and a second pulse, the one pulse rising or falling at a first time while falling or rising at a second time, the first pulse being generated at the first time one of ends of the transparent register mark enters the parallel light flux emitted from the irradiation device, the second pulse being generated at the second time the other end of the transparent register mark goes out the parallel light flux emitted from the irradiation device.

8. The register mark detecting apparatus according to claim 1, wherein the light source is a light source that emits strobe light, and the light receiving device is an image sensing device that takes an image of the light flux passing by the knife-edge.

9. The register mark detecting apparatus according to claim 8, further comprising display device for displaying an image taken by the image sensing device.

* * * * *